United States Patent Office 2,789,077
Patented Apr. 16, 1957

2,789,077

METHODS FOR PRODUCING DDT-BENZENE HEXACHLORIDE INSECTICIDES AND RESULTING COMPOSITIONS

Murray Zakheim, Philadelphia, Pa., assignor to The Pennsylvania Salt Manufacturing Company, Philadelphia, Pa., a corporation of Pennsylvania No Drawing. Application January 23, 1951,
Serial No. 207,428

9 Claims. (Cl. 167—30)

This invention relates to a benzene hexachloride and DDT composition of unusual properties and the method of making it.

DDT (2,2-bis(chlorophenyl)1,1,1-trichloroethane) and benzene hexachloride (usually abbreviated BHC, also called hexachlorocyclohexane) are two of the more important agricultural insecticides put into use during recent years. In general, each has its own field of application and for the most part the commercially used insecticidal formulations which contain one of these materials does not contain the other. But there are some applications where a formulation containing both benzene hexachloride and DDT is desirable. An example of such an application is in the dusting of cotton where it is common to use a DDT and benzene hexachloride formulation, the DDT being employed to control cotton boll worm and the benzene hexachloride being employed to control boll weevils and aphids. Generally, the relative proportion of the two organic insecticides for this application is about three parts of the gamma isomer of benzene hexachloride for every five parts of technical DDT.

These formulations containing DDT and benzene hexachloride are generally prepared in dust form and various techniques have been employed to incorporate the DDT and benzene hexachloride into the carrier dust. Thus, the two organic materials, either mixed or separately, may be melted and sprayed onto the carrier dust, or may be dissolved in a solvent, the solution sprayed on the carrier dust, and the solvent evaporated. The latter technique has the disadvantage of introducing additional operational steps, including solvent recovery unless this material is to be wasted. The spraying of the molten organic materials has the disadvantage that at the temperatures involved there is degradation of the organic insecticides; particularly, the passage of molten DDT through metal pipes at the high temperature at which its melt is mobile has a very deleterious effect on its chemical stability.

I have now discovered a combination of DDT and benzene hexachloride which can be incorporated in a carrier dust by a new technique, and employs the two insecticides in a ratio that makes the formulation particularly adapted to the usual uses of such mixtures. This new composition is a mixture of from 10 to 50% (preferably 20 to 40%) of a technical DDT, as hereinafter defined, and from 50 to 90% (preferably 60 to 80%) of a particular benzene hexachloride composition that is hereinafter defined.

The technical DDT employed in preparing this composition is a DDT containing at least 70% by weight of the p,p'-isomer (2,2-bis(p-chlorophenyl)1,1,1-trichloroethane) preferably 70 to 90% by weight of this isomer, and having a setting point not higher than 100° C., preferably in the range of 85 to 95° C.

The benzene hexachloride employed in making my composition is the material chiefly responsible for making my new composition and technique possible. This benzene hexachloride is hereinafter referred to as "technical BHC." It is a mixture of benzene hexachloride isomers containing from 25 to 50% gamma isomer, preferably 30 to 40% gamma isomer. The preferred material, containing from 30 to 40% gamma isomer, contains from 5 to 30% alpha isomer, 0 to 5% beta isomer, 15 to 25% other benzene hexachloride isomers (probably delta and epsilon), and 10 to 20% "overchlorinated" material (e. g., heptachlorocyclohexane, octachlorocyclohexane, etc.). This preferred technical BHC may be, for example, the so-called "gamma concentrate" product described in co-pending applications Serial Nos. 695,276, 695,277, 739,358, and 739,359.

The technical BHC suitable for use in my invention must have a melting point under 80° C. as determined by the melting point block method. In this method, the melting point is defined as the temperature at which the sample flows freely to the outer edges of the cover slips. The technical benzene hexachloride employed will generally melt above 40° C. although this temperature limit is not critical. A preferred "gamma concentrate" material for use in my invention generally melts within the range 50 to 75° C.

The above described composition has an unusual combination of properties. First, the above described mixture of technical DDT and technical benzene hexachloride, I have found, possesses a surprisingly low melting point, generally under 50° C., in almost every case under 60° C., and always under 70° C. Secondly, my preferred DDT-BHC mixture containing as its benzene hexachloride component from 60 to 80% of technical BHC of 30 to 40% gamma isomer content and 50–75° melting point, has the most unusual property of remaining a super-cooled liquid at room temperatures for as much as seventy-two hours. The usual advantage afforded by the latter property will be obvious; the mixture of active ingredients can be stored for a limited time, handled without heating, and yet is sprayable in liquid form onto the carrier dust where it will then soon harden (without volatilization of any solvent) to form a solid active ingredient. Moreover, the proportion of gamma isomer of benzene hexachloride to technical DDT in the composition of this unusual character is such that these materials are present in the ratio generally desired in mixed insecticidal formulations of the type described.

The formulation technique of my invention involves mixing from 50 to 90%, preferably 60 to 80%, of a technical BHC as above described, with from 10 to 50%, preferably 20 to 40%, of technical DDT as above described. Generally, the benzene hexachloride is first melted and the solid DDT dissolved in it. However, the solids may be mixed and the mixture heated to bring about liquefaction and complete mixing of the liquids. When it is desired to prepare the dust formulation the DDT-benzene hexachloride mixture, heated (if necessary) to re-melt (this is often not necessary if the mixture has been held at room temperature for under 72 hours) is sprayed onto a suitable finely divided carrier dust, for example, a clay, or talc, or pyrophyllite or other generally recognized insecticide carrier. The blending is carried out at a temperature below 80° C., preferably below 70° C. Very often blending may be accomplished at room temperature. Other desirable ingredients may be blended in, including the conventional surface active agents, dispersing agents, dust "stickers," etc., and including other active ingredients such as sulfur, toxaphene, various fungicides, etc. The term "composition" as used in the claims includes formulations containing one or more of these auxiliary ingredients as well as the preliminary mixture of BHC and DDT alone.

The following examples are illustrative of the process and product of my invention:

Example 1

150 parts by weight of technical BHC (analyzing 36.6% gamma isomer, 22% alpha, 3.5% beta, 15% other benzene hexachloride isomers, 17.5% overchlorinated material, and 5.4% oils not clearly identified—may be in part chlorobenzenes or additional BHC isomers or overchlorinated material—see Ramsey and Patterson, Journal of the Association of Official Agricultural Chemists, 29, 337 (1946) and Aepli, Munter, and Gall, Analytical Chemistry, 20, 610 (1948) describing the partition chromatographic method of analysis) were melted and to this was added 90 parts by weight of technical DDT (setting point 91° C. and containing 79% p,p'isomer). The DDT dissolved in the molten BHC which was maintained at 70° C. The sample was allowed to cool to room temperature. The mixture was then poured slowly onto 360 parts by weight of "Attaclay" with the blender in operation. After blending for 20 minutes, a free-flowing dust was had. This product was hammer milled to yield a much finer product.

Example 2

60 lb. technical DDT (same description as in Example 1) were added to 94.5 lb. molten gamma concentrate of the following analysis:

| | Percent |
|---|---|
| Gamma isomer | 38.0 |
| Alpha isomer | 21.6 |
| Beta isomer | 2.7 |
| Other isomers | 16.2 |
| Overchlorinated | 15.9 |
| Unidentified oils | 5.6 |

This mixture was stirred for 1 hour and 25 minutes before the DDT was in solution. The temperature of the mix was 140–155° F. This melt was then sprayed onto 565 lb. "Attaclay"; spraying time was 19 minutes. No difficulties were encountered during the spraying operation. The blender was operated for 10 minutes after the addition of the DDT–BHC material, and then 480 lb. sulfur (93% through 325 mesh) were added into the batch and blended for an additional five minutes.

The screen analysis was as follows:

| | Percent |
|---|---|
| +60 mesh | 0.0 |
| −60 mesh+325 mesh | 6.32 |
| −325 mesh | 93.68 |

Example 3

157 lb. of technical DDT (as described in Example 1) were added to 252 lb. BHC (as described in Example 2). An hour and 45 minutes were required to completely dissolve the DDT at a temperature of 155–165° F. 30 minutes were required to spray this mix into 791 lb. "Attaclay." Blending was carried on for one-half hour before packaging. Blending time during packaging was 35 minutes.

Screen analysis was:

| | Percent |
|---|---|
| +60 mesh | 0.0 |
| −60 mesh+325 mesh | 5.66 |
| −325 mesh | 94.34 |

Since many modifications are possible in the product and process of my invention as above described without departing from the scope of my invention, it is intended that the above description of my invention should be interpreted as illustrative, and the invention is not to be limited thereby.

I claim:

1. A new composition of matter consisting essentially of a DDT–BHC mixture in which the DDT is present in the form of a technical DDT containing at least 70%, 2,2-bis-(p-chlorophenyl)-1,1,1-trichloroethane and having a setting point not higher than about 100° C. and in which the BHC is present in the form of a technical BHC containing a gamma isomer content within the range 25 to 50% and melting below 80° C., said mixture containing from about 50 to about 90 parts of said technical BHC for every 10 to 50 parts of said technical DDT and having the property of remaining liquid for several hours when cooled to room temperature after having been heated to a molten state.

2. A DDT–BHC composition in which the DDT is present in the form of a technical DDT containing a 2,2-bis-(p-chlorophenyl)-1,1,1-trichloroethane content within the range 70 to 90% and having a setting point of 85° to 95° C., and in which the BHC is present in the form of a technical BHC containing a gamma isomer content within the range 25 to 50% and melting below 80° C., said composition containing from about 50 to about 90 parts of said technical BHC for every 10 to 50 parts of said technical DDT and having a setting point substantially below that of said technical BHC and said technical DDT and having the property of remaining liquid for several hours when cooled to room temperature after having been heated to a molten state.

3. A DDT–BHC composition in which the DDT is present in the form of a technical DDT containing a 2,2-bis-(p-chlorophenyl)-1,1,1-trichloroethane content within the range 70 to 90% and having a setting point of 85° to 95° C., and in which the BHC is present in the form of a technical BHC containing a gamma isomer content within the range 25 to 50% and melting below 80° C., said composition containing from about 60 to about 80 parts of said technical BHC for every 20 to 40 parts of said technical DDT and having a setting point substantially below that of said technical BHC and said technical DDT and having the property of remaining liquid for several hours when cooled to room temperature after having been heated to a molten state.

4. A new composition of matter consisting essentially of a DDT–BHC mixture in which the DDT is present in the form of a technical DDT containing a 2,2-bis-(p-chlorophenyl)-1,1,1-trichloroethane content within the range 70 to 90% and having a setting point within the range of 85° to 95° C., and in which the BHC is present in the form of a technical BHC containing from 30 to 40% gamma isomer, 5 to 30% alpha isomer, 0 to 5% beta isomer, 15 to 25% other isomers, and 10 to 20% overchlorinated material, and melting below 75° C., said mixture containing from about 50 to about 90 parts of said technical BHC for every 10 to 50 parts of said technical DDT, said mixture melting below 60° C. and having the property of remaining a liquid for several hours when cooled to room temperature after having been heated to a molten state.

5. A DDT–BHC composition in which the DDT is present in the form of a technical DDT containing a 2,2-bis-(p-chlorophenyl)-1,1,1-trichloroethane content within the range 70 to 90% and having a setting point within the range of 85 to 95° C., and in which the BHC is present in the form of a technical BHC containing from 30 to 40% gamma isomer, 5 to 30% alpha isomer, 0 to 5% beta isomer, 15 to 25% other isomers, 10 to 20% overchlorinated material, and melting below 75° C., said composition containing from about 60 to about 80 parts of said technical BHC for every 20 to 40 parts of said technical DDT and having a setting point substantially below that of said technical BHC and said technical DDT and having the property of remaining a liquid for several hours when cooled to room temperature after having been heated to a molten state.

6. The method of preparing an agricultural dust containing DDT and BHC which comprises mixing from 10 to 50 parts of a technical DDT containing at least 70% 2,2-bis-(p-chlorophenyl)-1,1,1-trichloroethane and having a setting point not higher than about 95° C. with from 50 to 90 parts of a technical BHC containing from 25 to 50% gamma isomer and melting below 80° C., with sufficient heating to bring about substantially complete liquefaction of both the technical DDT and technical BHC, and mixing the resulting liquid with a finely divided carrier dust at a temperature below 80° C.

7. The method of preparing an agricultural dust containing DDT and BHC which comprises mixing from 10 to 50 parts of a technical DDT containing 70% to 90% 2,2-bis-(p-chlorophenyl)-1,1,1-trichloroethane and having a setting point within the range 85° to 95° C. with from 50 to 90 parts of a technical BHC containing from 25 to 50% gamma isomer and melting below 75° C., with sufficient heating to bring about substantially complete liquefaction of both the technical DDT and technical BHC, and mixing the resulting liquid with a finely divided carrier dust at a temperature below 80° C.

8. The method of preparing an agricultural dust containing DDT and BHC which comprises mixing from 20 to 40 parts of a technical DDT containing 70 to 90% 2,2-bis-(p-chlorophenyl)-1,1,1-trichloroethane and having a setting point within the range 85° to 95° C. with from 60 to 80 parts of a technical BHC containing from 30 to 40% gamma isomer, 5 to 30% alpha isomer, 0 to 5% beta isomer, 15 to 25% other isomers, and 10 to 20% overchlorinated material, the technical BHC melting in the range 50° to 75° C., with sufficient heating to bring about substantially complete liquefaction of both the technical DDT and technical BHC, and mixing the resulting liquid with a finely divided carrier dust at a temperature below 70° C.

9. The method of claim 6 wherein said liquid mixture of DDT and BHC is prepared by first heating the BHC to a temperature at which it is liquefied but below the temperature required for liquefaction of the DDT and then adding the solid DDT to said liquid BHC to obtain said liquefaction of DDT and BHC, said temperature being maintained throughout said liquefaction below that necessary to liquefy the DDT alone.

References Cited in the file of this patent

UNITED STATES PATENTS

| | | |
|---|---|---|
| 2,420,295 | Biehn | May 13, 1947 |
| 2,506,635 | Flenner | May 9, 1950 |

FOREIGN PATENTS

| | | |
|---|---|---|
| 573,689 | Great Britain | Dec. 3, 1945 |
| 654,562 | Great Britain | June 20, 1951 |

OTHER REFERENCES

Haller et al.: J. Am. Chem. Soc., vol. 67, pp. 1591–1602, September 1945.

Gaines et al.: J. Econ. Ent., vol. 41, pp. 548–554, August 1948.

"Phase Rule and Phase Reactions," by S. T. Bowden, published in London, 1950, by MacMillan & Co., pp. 147–153, 164–170, 180, 175.

"Pharmaceutical Dispensing," by W. J. Husa 3rd, 1947, published by Husa Bros., Iowa City, Iowa, pp. 59–64.